(12) United States Patent
Park et al.

(10) Patent No.: US 11,870,065 B1
(45) Date of Patent: Jan. 9, 2024

(54) NEGATIVE ELECTRODE FOR LITHIUM SECONDARY BATTERY AND METHOD OF MANUFACTURING THE SAME

(71) Applicant: SK On Co., Ltd., Seoul (KR)

(72) Inventors: Eun Jun Park, Daejeon (KR); Gwi Ok Park, Daejeon (KR); Hyo Shik Kil, Daejeon (KR); In Ae Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/339,237

(22) Filed: Jun. 22, 2023

(30) Foreign Application Priority Data

Jun. 23, 2022 (KR) .................. 10-2022-0076581

(51) Int. Cl.
| | | |
|---|---|---|
| *H01M 4/38* | (2006.01) | |
| *H01M 10/0525* | (2010.01) | |
| *H01M 4/131* | (2010.01) | |
| *H01M 4/1391* | (2010.01) | |
| *H01M 4/134* | (2010.01) | |
| *H01M 4/1395* | (2010.01) | |
| *H01M 4/04* | (2006.01) | |
| *H01M 4/02* | (2006.01) | |

(52) U.S. Cl.
CPC ......... *H01M 4/386* (2013.01); *H01M 4/0471* (2013.01); *H01M 4/131* (2013.01); *H01M 4/134* (2013.01); *H01M 4/1391* (2013.01); *H01M 4/1395* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2022/0153594 A1* 5/2022 Ionescu .............. H01M 4/134

FOREIGN PATENT DOCUMENTS

| JP | 2007-026983 A | 2/2007 |
|---|---|---|
| JP | 6765997 B2 | 10/2020 |
| KR | 10-1084077 B1 | 11/2011 |
| KR | 10-2019-0071301 A | 6/2019 |

\* cited by examiner

*Primary Examiner* — Wyatt P McConnell
(74) *Attorney, Agent, or Firm* — IP & T GROUP LLP

(57) ABSTRACT

Provided are a negative electrode for a lithium secondary battery and a method of manufacturing the same. The negative electrode for a lithium secondary battery according to an embodiment of the present invention includes a negative electrode active material including: a silicon oxide, lithium, and sodium or potassium, wherein in ICP analysis of a negative electrode active material layer including the negative electrode active material, contents of elements in the negative electrode active material layer satisfy the following Relations (1) and (2):

$$300 \leq 10^6 * A/(B^2+C^2) \leq 12.0*10^6 \quad (1)$$

$$800 \leq A \leq 140{,}000 \quad (2)$$

wherein A is a Li content in ppm, B is a Na content in ppm, and C is a K content in ppm, based on the total weight of the ICP-analyzed negative electrode active material layer.

20 Claims, No Drawings

NEGATIVE ELECTRODE FOR LITHIUM SECONDARY BATTERY AND METHOD OF MANUFACTURING THE SAME

CROSS-REFERENCE TO RELATED APPLICATIONS

This application claims priority under 35 U.S.C. § 119 to Korean Patent Application No. 10-2022-0076581, filed on Jun. 23, 2022, in the Korean Intellectual Property Office, the disclosure of which is incorporated herein by reference in its entirety.

TECHNICAL FIELD

The following disclosure relates generally to a negative electrode for a lithium secondary battery and a method for manufacturing the same.

BACKGROUND

In recent years, demand for environmentally friendly technologies for solving the global warming problem is rapidly increasing. In particular, as demand for electric vehicles and energy storage systems (ESS) increases, demand for lithium secondary batteries is also exploding.

A conventional lithium secondary battery generally uses a carbon (C)-based negative electrode material such as natural graphite and artificial graphite, but the energy density of a battery using graphite is low due to the low theoretical capacity of graphite of 372 mAh/g. Therefore, studies on a new negative electrode material for improving the low energy density are in progress.

As a solution for increasing the energy density, a silicon (Si)-based negative electrode material having a high theoretical capacity of 3580 mAh/g has been proposed. However, the silicon-based negative electrode material has poor battery life characteristics due to a large volume expansion (~400%) in the process of repeated charging and discharging.

As a method for solving the volume expansion issue of the silicon-based negative electrode material, a silicon oxide-based negative electrode material having a volume expansion rate lower than Si has been developed. The silicon oxide-based negative electrode material shows better life characteristics than the silicon-based negative electrode material, due to its low volume expansion rate. However, a battery using the silicon oxide-based negative electrode material has poor initial coulombic efficiency (ICE) due to the formation of an irreversible phase at the beginning of operation, and has poor industrial usability due to the poor initial coulombic efficiency. In addition, the silicon oxide-based negative electrode material has low electrical conductivity and a non-uniform current distribution of the surface, so that the life characteristics of a battery using the silicon oxide-based negative electrode material are generally poor.

SUMMARY

An embodiment of the present invention is directed to providing a negative electrode for a lithium secondary battery exhibiting improved initial coulombic efficiency (also referred to hereinafter simply as initial efficiency) and capacity and improved battery life characteristics, and a method of manufacturing the same.

Another embodiment of the present invention is directed to further improving life characteristics of a lithium secondary battery by securing a uniform current distribution on a surface of a negative electrode active material in a prelithiated negative electrode.

In one general aspect, a negative electrode for a lithium secondary battery includes a negative electrode active material including: a silicon oxide; lithium; and sodium or potassium, wherein in ICP (inductively coupled plasma spectrometer) analysis of a negative electrode active material layer including the negative electrode active material, contents of elements in the negative electrode active material layer satisfy the following Relations (1) and (2):

$$300 \leq 10^6 * A/(B^2+C^2) \leq 12.0 * 10^6 \quad (1)$$

$$800 \leq A \leq 140{,}000 \quad (2)$$

wherein A is a Li content in ppm (parts per million), B is a Na (sodium) content in ppm, and C is a K (potassium) content in ppm, based on the total weight of the ICP-analyzed negative electrode active material layer.

In addition, in the negative electrode for a lithium secondary battery according to an embodiment of the present invention, in the ICP analysis of the negative electrode active material layer, the contents of elements in the negative electrode active material layer may further satisfy the following Relation (3) or (4):

$$50 \leq B \leq 20{,}000 \quad (3)$$

$$15 \leq C \leq 10{,}000 \quad (4)$$

wherein B is a Na content in ppm, and C is a K content in ppm, based on the total weight of the ICP-analyzed negative electrode active material layer.

In addition, according to an embodiment of the present invention, in Relation (3), $200 \leq B \leq 20{,}000$ may be satisfied, or in Relation (4), $30 \leq C \leq 10{,}000$ may be satisfied.

In addition, in the negative electrode for a lithium secondary battery according to an embodiment of the present invention, in the ICP analysis of the negative electrode active material layer, the contents of elements in the negative electrode active material layer may further satisfy the following Relation (5):

$$25 \leq B+C \quad (5)$$

wherein B is a Na content in ppm, and C is a K content in ppm, based on the total weight of the ICP-analyzed negative electrode active material layer.

In addition, according to an embodiment of the present invention, the negative electrode active material may include a lithium silicate represented by the following Chemical Formula 1:

$$\text{Li}_x\text{Si}_y\text{O}_z \quad \text{[Chemical Formula 1]}$$

wherein $1 \leq x \leq 6$, $1 \leq y \leq 4$, and $0 < z \leq 7$.

In addition, the negative electrode for a lithium secondary battery according to an embodiment of the present invention may further include artificial graphite.

In addition, the negative electrode for a lithium secondary battery according to an embodiment of the present invention may further include single-walled carbon nanotubes.

In another general aspect, a method of manufacturing a negative electrode for a lithium secondary battery includes: a1) performing pre-lithiation by mixing a silicon-based material including a silicon oxide and a lithium precursor and heat treating the mixture to dope the silicon-based material with lithium; a2) stirring a solution or dispersion including the silicon-based material doped with lithium and a sodium precursor or a potassium precursor; and a3) heat treating the product of the process a2), thereby preparing a negative electrode active material doped with sodium or potassium.

In addition, according to an embodiment of the present invention, in the process a1), the silicon-based material and the lithium precursor may be mixed so that a mole ratio of Li/Si is 0.3 to 1.2.

In addition, according to an embodiment of the present invention, the process a2) may be the stirring of the solution or dispersion including the silicon-based material doped with lithium and the sodium precursor or the potassium precursor so that a Na/Si mole ratio is more than 0 and 0.05 or less or a K/Si mole ratio is more than 0 and 0.08 or less.

In addition, according to an embodiment of the present invention, in the process a2), a stirring speed may be 100 to 3000 rpm.

In addition, according to an embodiment of the present invention, in the process a2), a temperature during stirring may be 15 to 80° C.

In addition, according to an embodiment of the present invention, the heat treating in the process a3) may be performed at 200 to 1000° C.

In addition, according to an embodiment of the present invention, the sodium precursor may include one of a Na metal; a Na oxide; a Na compound or Na oxide containing one or more of F, Cl, Br, I, C, N, P, S, and H; and a Na composite oxide containing one or more metals of Li, Ti, V, Cr, Mn, Fe, Co, and Ni, or a combination thereof.

In addition, according to an embodiment of the present invention, the potassium precursor may include one of a K metal; a K oxide; a K compound or K oxide containing one or more of F, Cl, Br, I, C, N, P, S, and H; and a K composite oxide containing one or more metals of Li, Ti, V, Cr, Mn, Fe, Co, and Ni, or a combination thereof.

In addition, according to an embodiment of the present invention, the silicon-based material may include $SiO_x$ ($0<x\leq2$); and one or more of Si, a Si-containing alloy, and a Si/C composite.

In another general aspect, a method of manufacturing a negative electrode for a lithium secondary battery includes: b1) stirring a solution or dispersion including a silicon-based material including a silicon oxide, a lithium precursor, and a sodium precursor or a potassium precursor; and b2) heat treating the product of the process b1), thereby preparing a negative electrode active material doped with sodium or potassium.

In addition, according to an embodiment of the present invention, the process b1) may be the stirring of the solution or dispersion including the silicon-based material and the sodium precursor or the potassium precursor so that a Na/Si mole ratio is more than 0 and 0.05 or less or a K/Si mole ratio is more than 0 and 0.08 or less.

In addition, according to an embodiment of the present invention, the heat treating in the process b2) may be performed at 200 to 1000° C.

In still another general aspect, a lithium secondary battery includes the negative electrode according to one embodiment of the embodiments described above.

Other features and aspects will be apparent from the following detailed description, the drawings, and the claims.

DETAILED DESCRIPTION OF EMBODIMENTS

Advantages and features of the present invention and methods to achieve them will be elucidated from embodiments described below in detail with reference to the accompanying drawings. However, the present invention is not limited to embodiments disclosed below, but will be implemented in various forms. The embodiments of the present invention provide a thorough disclosure of the present invention so that those skilled in the art can easily understand the present invention. However, the scope of the present invention will be defined by the scope of the appended claims. Detailed description for carrying out the present invention will be provided with reference to the accompanying drawings below. Same reference numbers in different drawings indicate similar or identical elements. The phrase "and/or" includes each of and all combinations of one or more of mentioned items.

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being "on" or "above" another element, it can be directly on the other element or intervening elements may also be present.

In the present specification, an average particle size may refer to D50, and D50 refers to a diameter of a particle with a cumulative volume of 50% when cumulated from the smallest particle in measurement of a particle size distribution by a laser scattering method. Here, for D50, the particle size distribution may be measured by collecting a sample according to the KS A ISO 13320-1 standard and using Mastersizer 3000 from Malvern Panalytical Ltd. Specifically, a volume density may be measured after dispersion is performed using ethanol as a solvent, and, if necessary, using an ultrasonic disperser.

According to an embodiment of the present invention, in order to complement low initial efficiency (ICE) at the beginning of battery operation to which a silicon oxide-based negative electrode material is applied, a pre-lithiation process of a negative electrode active material including a silicon oxide may be performed. The lithium silicate produced by the pre-lithiation process may complement the low initial efficiency of a battery.

According to an embodiment of the present invention, in order to secure a uniform current distribution on the surface of the negative electrode active material to improve life characteristics, sodium or potassium may be single doped or co-doped after or during the pre-lithiation process.

According to an embodiment of the present invention, a negative electrode for a lithium secondary battery including a negative electrode active material including: a silicon oxide, lithium, and sodium or potassium may be provided, wherein in ICP analysis of a negative electrode active material layer including the negative electrode active material, contents of elements in the negative electrode active material layer satisfy the following Relations (1) and (2):

$$300 \leq 10^6 * A/(B^2+C^2) \leq 12.0*10^6 \quad (1)$$

$$800 \leq A \leq 140{,}000 \quad (2)$$

wherein A is a Li content in ppm, B is a Na content in ppm, and C is a K content in ppm, based on the total weight of the ICP-analyzed negative electrode active material layer.

According to an embodiment, the ICP analysis of the negative electrode active material layer may be performed on a negative electrode extracted from a half battery which is manufactured by disposing a negative electrode to be analyzed, a lithium metal as a counter electrode, and a PE separator between the negative electrode and the counter electrode and injecting an electrolyte solution to manufacture a CR2016 type coin cell, and pausing the assembled coin cell at room temperature for 3 to 24 hours. Here, the electrolyte solution injected into the coin cell may be obtained by mixing 1.0 M $LiPF_6$ as a lithium salt with an organic solvent (EC:EMC=30:70 vol %) and mixing 2 to 5 vol % of fluoroethylene carbonate (FEC) as an electrolyte additive therewith. The half battery manufactured was charged at a constant current at room temperature (25° C.) until the voltage reached 0.01 V (vs. $Li/Li^+$) at a current of 0.1 C rate, and then was charged with a constant voltage by cut-off at a current of 0.01 C rate while maintaining 0.01 V in a constant voltage mode. The battery was discharged at a constant current of 0.1 C rate until the voltage reached 1.5 V (vs. $Li/Li^+$). One charge and discharge cycle was performed under the charge and discharge conditions, and then disassembly was performed to obtain a negative electrode. Next, the negative electrode obtained by disassembly was washed with an organic solvent such as dimethyl carbonate (DMC) several times, and negative electrode active material layer powder was recovered by scrapping off the powder so that a current collector is not included.

A method of measuring the Li content (A), the Na content (B), and K content (C) using the negative electrode active material layer powder recovered above may be the following:
[1] adding 0.01 to 0.05 g of the recovered negative electrode active material layer powder to a 50 mL PP tube;
[2] adding nitric acid to the PP tube and then adding a hydrofluoric acid thereto until brown fume does not occur;
[3] heating the PP tube with a heating block and drying the tube to remove a hydrofluoric component;
[4] adding nitric acid and hydrogen peroxide to the PP tube and then heating the PP tube with a heating block for redissolving;
[5] cooling the resulting product to room temperature, diluting it with ultrapure water, and filtering it for removing insoluble components to prepare a sample; and
[6] performing ICP analysis on the prepared sample to measure the Li content (A), the Na content (B), and the K content (C) (A, B, and C are the weights (ppm) of Li, Na, and K included based on the total weight of the negative electrode active material layer (powder) to be measured, respectively).

Here, the ICP analysis may be performed using Optima 8300DV ICP spectrometer available from Perkin Elmer.

The negative electrode to be analyzed may be a freshly manufactured electrode, and may be obtained by disassembling a finished battery or a battery purchased on the market. The finished battery or the battery purchased on the market may be previously subjected to 5 cycles or less of charge and discharge during the manufacturing process of the battery, for example, a formation process or the like. However, since a change in the resulting value of the ICP analysis of the negative electrode active material layer is very small by performing 5 cycles or less of charge and discharge, the negative electrode obtained by disassembling a finished battery or a battery purchased on the market was manufactured into a half battery under the same conditions as described above, the half battery was discharged to 1.5 V (vs. $Li/Li^+$), the negative electrode was disassembled, and ICP analysis may be performed on the disassembled negative electrode by the same method as described above.

According to the present invention, by performing the ICP analysis of the negative electrode active material layer according to an embodiment described above, the contribution of sodium or potassium doped into a prelithiated negative electrode material to the uniform current distribution on the surface of the negative electrode active material may be quantitatively evaluated.

Hereinafter, the reasons for defining Relations (1) and (2) will be described, respectively.

A sodium or potassium cation allows easy approach of electrons, but has very low reactivity with a negative electrode active material containing a silicon oxide. In view of this, Relation (1) is a parameter for decreasing local deterioration of an electrode due to repeated cycles to secure an effect of improving life characteristics, by securing a uniform current distribution on the surface of a negative electrode active material by single doping or co-doping of sodium or potassium. The resulting value of Relation (1) may be derived by substituting the numerical values of the Li content in ppm, the Na content in ppm, and K content in ppm without a unit into Relation (1).

When Relation (1) is less than the lower limit 300, the content of doped sodium or potassium is excessive as compared with the Li ion, and thus, a smooth reaction between Li ions and electrons is hindered, so that the life characteristics may be rather deteriorated, which is not preferred. From the point of view of the smooth reaction between Li ions and electrons, the lower limit of Relation (1) may be, for example, 400 or more, 500 or more, 600 or more, or 700 or more.

However, when the value is more than the upper limit of Relation (1) of $12.0*10^6$, the content of doped sodium or potassium is too small as compared with the Li ion, and thus, the effect of improving the life characteristics by securing a uniform current distribution on the surface of the negative electrode active material by adding sodium or potassium may not be sufficiently secured. From the point of view of securing the uniform current distribution on the surface of the negative electrode active material by single doping or co-doping of sodium or potassium, the upper limit of Relation (1) may be preferably, for example, $11.0*10^6$ or less, $10.0*10^6$ or less, or $9.0*10^6$.

Relation (2) is a parameter for securing sufficient initial battery efficiency by pre-lithiation. When the value is less than the lower limit of Relation (2) of 800, sufficient initial efficiency may not be secured by pre-lithiation. When the value is more than the upper limit of Relation (2) of 140,000, a lithium content is excessive, so that it is difficult to store the prepared negative electrode active material in the air without deterioration, and it is difficult to secure slurry stability due to a reaction with water in the preparation of the slurry. In addition, a molecular binding of a binder is broken, and thus, control to a certain level of viscosity required for coating may not be allowed, making electrode coating difficult, and it is difficult to secure a slurry for a long time due to gas generation. In addition, since an excessive amount of lithium is used as compared with an optimal lithium content, an expensive lithium raw material should be used in a large amount in the preparation of an active material, which may cause costs to rise. In addition, in particular, when an excessive amount of lithium is doped, the excessive amount of a lithium compound surrounds the negative electrode active material so that sodium or potassium may not react with or be doped into the negative electrode active material directly, and during preparation of a slurry, an excessive amount of lithium compound on the surface of the negative electrode active material is dissolved in moisture so that sodium or potassium is removed together, and thus, sodium or potassium may not be sufficiently doped.

From the foregoing point of view, in a preferred embodiment, A may be, for example, 800 or more, 1,000 or more, 2,000 or more, 3,000 or more and 140,000 or less, 120,000 or less, 100,000 or less, 80,000 or less, 50,000 or less, or between these numerical values. In an embodiment, A may be 800 to 140,000, 2,000 to 100,000, and 3,000 to 80,000.

According to an embodiment of the present invention, by satisfying Relations (1) and (2), the sufficient initial efficiency of a battery may be secured by pre-lithiation, and the uniform current distribution on the surface of the negative electrode active material is secured by single doping or co-doping of sodium or potassium to improve the life characteristics of a battery.

When Relations (1) and (2) are satisfied, the life characteristics may be sufficiently improved, but according to a preferred embodiment of the present invention, it is preferred that in the ICP analysis of the negative electrode active material layer, the contents of elements in the negative electrode active material layer further satisfy the following Relation (3) or (4), since the effects described above may be better secured:

$$50 \leq B \leq 20{,}000 \quad (3)$$

$$15 \leq C \leq 10{,}000 \quad (4)$$

wherein B is a Na content in ppm, and C is a K content in ppm, based on the total weight of the ICP-analyzed negative electrode active material layer.

Hereinafter, the reasons for defining Relations (3) and (4) will be described.

Relations (3) and (4) are parameters for securing an effect of improving life characteristics by securing a uniform current distribution by sodium doping in Relation (3) and potassium doping in Relation (4). According to an embodiment of the present invention, when Relation (3) or (4) is further satisfied in addition to Relations (1) and (2), an appropriate amount of sodium or potassium for further improving the life characteristics by securing a uniform current distribution on the surface of the negative electrode active material may be doped, which is thus preferred.

From the foregoing point of view, in an embodiment, B may be, for example, 50 or more, 100 or more, 200 or more, 300 or more and 20,000 or less, 150,000 or less, 10,000 or less, or between these numerical values. In an embodiment, B may be 50 to 20,000, 100 to 20,000, and is 200 to 20,000 or 300 to 20,000.

From the foregoing point of view, in an embodiment, C may be, for example, 15 or more, 30 or more, 40 or more and 10,000 or less, 8,000 or less, 5,000 or less, 3,000 or less, or between these numerical values. In an embodiment, C may be 15 to 10,000, preferably 30 to 10,000, and more preferably 40 to 10,000.

When Relations (1) and (2) are satisfied, the life characteristics may be sufficiently improved, but according to a preferred embodiment of the present invention, it is preferred that in the ICP analysis of the negative electrode active material layer, the contents of elements in the negative electrode active material layer further satisfy the following Relation (5), since the effects described above may be better provided:

$$25 \leq B + C \quad (5)$$

wherein B is a Na content in ppm, and C is a K content in ppm, based on the total weight of the ICP-analyzed negative electrode active material layer.

Hereinafter, the reason for defining Relation (5) will be described.

Relation (5) is a parameter for securing an effect of improving life characteristics by securing a uniform current distribution, considering the case of single doping or co-doping of sodium or potassium. According to an embodiment of the present invention, when Relation (5) is further satisfied in addition to Relations (1) and (2), an appropriate amount of sodium or potassium for further improving the life characteristics by securing a uniform current distribution on the surface of the negative electrode active material may be doped.

From the foregoing point of view, in a preferred embodiment, B+C may be, for example, 25 or more, 30 or more, 40 or more, 50 or more, 60 or more, 70 or more, 80 or more and 10,000 or less, 8,000 or less, 7,000 or less, or between these numerical values. In an embodiment, B+C may be 25 to 10,000, 30 to 10,000, 40 to 10,000, 50 to 10,000, 60 to 10,000, and 70 to 10,000 or 80 to 10,000.

According to an embodiment of the present invention, the negative electrode may include a silicon oxide, lithium, and sodium or potassium.

In addition, the negative electrode active material may include $SiO_x$ (0<x≤2); and one or more of Si, a Si-containing alloy, and a Si/C composite. The Si-containing alloy may be, for example, a Si-Q alloy. Q is an element selected from the group consisting of alkali metals, alkaline earth metals, group 13 elements, group 14 elements other than Si, group 15 elements, group 16 elements, transition metals, rare earth elements, and combinations thereof. The element Q may be, for example, selected from the group consisting of Li, Mg, Na, K, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

The negative electrode for a lithium secondary battery according to an embodiment of the present invention performs a pre-lithiation process in terms of further improving initial efficiency and life characteristics, and the negative electrode active material may include lithium. Lithium may be doped into or chemically bonded to the negative electrode active material.

According to an embodiment, the negative electrode active material may further include a lithium silicate represented by the following Chemical Formula 1:

$$Li_x si_y O_z \quad \text{[Chemical Formula 1]}$$

wherein 1≤x≤6, 1≤y≤4, and 0<z≤7.

The negative electrode for a lithium secondary battery according to an embodiment of the present invention includes a current collector, and a negative electrode active material layer which is prepared on the current collector and includes the negative electrode active material and a binder.

According to an embodiment of the present invention, the current collector may be selected from the group consisting of a copper foil, a nickel foil, a stainless steel foil, a titanium foil, a nickel foam, a copper foam, a polymer substrate coated with a conductive metal and a combination thereof. However, the current collector is not limited thereto.

According to an embodiment of the present invention, the negative electrode active material may further include a material capable of reversibly inserting/desorbing a lithium ion, a lithium metal, an alloy of lithium metal, a material capable of being doped and de-doped with lithium, or a transition metal oxide.

An example of the material capable of reversibly inserting/desorbing a lithium ion may include a carbon material, that is, a carbon-based negative electrode active material which is commonly used in the lithium secondary battery. An example of the carbon-based negative electrode active material may include crystalline carbon, amorphous carbon, or a combination thereof. A crystalline carbon may include, for example, graphite such as amorphous, plate-like, flake-like, spherical, or fibrous natural graphite or artificial graphite. An example of amorphous carbon may include soft carbon, hard carbon, a mesophase pitch carbide, calcined coke, and the like.

The alloy of lithium metal may be, for example, an alloy of lithium with a metal selected from the group consisting of Na, K, Rb, Cs, Fr, Be, Mg, Ca, Sr, Si, Sb, Pb, In, Zn, Ba, Ra, Ge, Al, and Sn.

The material capable of doping or de-doping with lithium may be a silicon-based material, for example, Si, $SiO_x$ ($0<x\leq2$), a Si-Q alloy (Q is an element selected from the group consisting of alkali metals, alkaline earth metals, Group 13 elements, Group 14 elements, Group 15 elements, Group 16 elements, transition metals, rare-earth elements, and combinations thereof, but is not Si), a Si-carbon composite, Sn, $SnO_2$, a Sn—R alloy (R is an element selected from the group consisting of alkali metals, alkaline earth metals, Group 13 elements, Group 14 elements, Group 15 elements, Group 16 elements, transition metals, rare-earth elements, and combinations thereof, but is not Si), a Sn-carbon composite, and the like, and also, a mixture of at least one thereof and $SiO_2$ may be used. The elements Q and R may be, for example, selected from the group consisting of Na, K, Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

The transition metal oxides may be, for example, a lithium titanium oxide.

According to an embodiment of the present invention, the binder serves to adhere the negative electrode active material particles to each other well, and also serves to adhere the negative electrode active material to the current collector well. As the binder, all binders known in the art may be used, but for example, it may be a water-based binder, and a non-limiting example of the water-based binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDP), sulfonated-EPDM, styrene-butadiene rubber (SBR), fluorine rubber, various copolymers thereof, and the like. For example, the binder may include one of carboxyl methyl cellulose (CMC), styrene-butadiene rubber (SBR), and a mixture thereof.

The negative electrode active material layer according to an embodiment may further selectively include a conductive material. The conductive material is used for imparting conductivity to an electrode, and any material having conductivity without causing a chemical change to a battery may be used without limitation. An example of the conductive material may include a carbon-based material such as natural graphite, artificial graphite, carbon black, acetylene black, ketjen black, carbon fiber, single-walled carbon nanotubes (SW-CNT), and multi-walled carbon nanotubes (MW-CNT); a metal-based material such as metal powder or metal fiber of copper, nickel, aluminum, silver, and the like; a conductive polymer such as a polyphenylene derivative; or a mixture thereof.

The contents of the binder and the conductive material in the negative electrode active material layer may be, for example, 0.1 to 10 wt %, for example, 0.1 to 5 wt % with respect to the total weight of the negative electrode active material layer. However, the contents of the binder and the conductive material are not limited to the example described above.

In the negative electrode for a lithium secondary battery according to the present invention described above, according to an embodiment, the negative electrode active material may be prepared by mixing a negative electrode active material precursor including a silicon oxide with a solution or dispersion prepared by dissolving or dispersing a sodium precursor or potassium precursor as a doping raw material in a water-based or non-water-based solution or dispersion medium, and performing a heat treatment, but the present invention is not particularly limited thereto, and the negative electrode may be manufactured by various manufacturing methods without limitation, as long as Relations (1) and (2) are satisfied, or, Relation (3), (4), or (5) is further satisfied. The water-based or non-water-based solvent or dispersion medium may be all materials known in the art, and is not particularly limited.

In particular, in the embodiment, when a solution or dispersion, in which a sodium precursor or a potassium precursor is dissolved or dispersed, and a negative electrode active material including a silicon oxide are stirred, sodium or potassium may be uniformly doped in the negative electrode active material to secure a uniform current distribution, which is thus preferred. Meanwhile, when an alloy or the like including sodium or potassium is brought into simple pressure contact or contact with the surface of a negative electrode plate on which a silicon-based material thin film is prepared, and then is electrochemically inserted or doped using thermal diffusion, sodium or potassium may not be uniformly doped, and in this case, a uniform current distribution may not be secured and life characteristics to be desired may not be secured, which is thus not preferred.

Hereinafter, the method of manufacturing a negative electrode for a lithium secondary battery according to an embodiment of the present invention will be described.

According to an embodiment of the present invention, a method of manufacturing a negative electrode for a lithium secondary battery including: a1) performing pre-lithiation by mixing a silicon-based material including a silicon oxide and a lithium precursor and heat treating the mixture to dope the silicon-based material with lithium; a2) stirring a solution or dispersion including the silicon-based material doped with lithium and a sodium precursor or a potassium precursor; and a3) heat treating the product of the process a2), thereby preparing a negative electrode active material doped with sodium or potassium, may be provided.

According to an embodiment of the present invention, the silicon-based material containing the silicon oxide may include $SiO_x$ ($0<x\leq2$); and one or more of Si, a Si-containing alloy, and a Si/C composite. The Si-containing alloy may be, for example, a Si-Q alloy. Q is an element selected from the group consisting of alkali metals, alkaline earth metals, group 13 elements, group 14 elements other than Si, group 15 elements, group 16 elements, transition metals, rare earth elements, and combinations thereof. The element Q may be, for example, selected from the group consisting of Li, Mg, Na, K, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

According to an embodiment of the present invention, the silicon-based material may be prepared by appropriately mixing silicon powder and silicon oxide ($SiO_x$ ($0<x\leq 2$)) powder, and then performing a heat treatment at a temperature of 500 to 1600° C. for 1 to 12 hours under an inert atmosphere and reduced pressure conditions. The prepared silicon-based material may be produced into particles by pulverization.

The lithium precursor of the process a1) may include a lithium hydride, a lithium hydroxide, a lithium oxide, a lithium carbonate, lithium particles, or a combination thereof. For example, the lithium precursor may include one or more of LiOH, Li, LiH, $Li_2O$, and $Li_2CO_3$.

The pre-lithiation process a1) of doping the silicon-based material with lithium may be, for example, appropriately mixing the silicon-based material and the lithium precursor and then performing a heat treatment. According to an example, the silicon-based material and the lithium precursor may be mixed so that a Li/Si molar ratio is 0.3 to 1.2 or 0.4 to 1.0.

The heat treatment a1) may be performed at 500 to 1000° C. or 500 to 700° C. for 1 to 12 hours. A lithium doping process using an electrochemical method of oxidation reduction method may be used to easily form lithium silicate. However, a production rate of a lithium silicate having a relatively significantly improved volume expansion mitigation effect among lithium silicates under the heat treatment conditions described above is higher. For example, the production rate of $Li_2SiO_3$ having a relatively significantly improved volume expansion mitigation effect among lithium silicates is higher when the heat treatment conditions described above is applied than when an electrochemical method or an oxidation reduction method is used, which is thus advantageous for improving the battery life characteristics.

According to an embodiment of the present invention, the silicon-based material may be doped with lithium by the pre-lithiation process a1) described above. According to an example, lithium silicate may be prepared in at least a part of the silicon-based material.

After the pre-lithiation process a1) described above, according to an embodiment of the present invention, a process a2) of stirring a solution or dispersion including the silicon-based material doped with lithium and a sodium precursor or a potassium precursor may be performed. According to an example, the solution or dispersion may be prepared by dispersing or dissolving a sodium precursor or a potassium precursor as a doping raw material in a water-based or non-water-based solvent or dispersion medium, and may be heat treated after mixing it with the silicon-based material doped with lithium. The water-based or non-water-based solvent or dispersion medium may be all materials known in the art, and is not particularly limited.

According to an embodiment of the present invention, the sodium precursor may include one of a Na metal; a Na oxide; a Na compound or Na oxide containing one or more of F, Cl, Br, I, C, N, P, S, and H; and a Na composite oxide containing one or more metals of Li, Ti, V, Cr, Mn, Fe, Co, and Ni, or a combination thereof. The sodium precursor may be, for example, Na, NaOH, $NaNO_3$, $Na_3PO_4$, $Na_2CO_3$, $Na_2S$, $Na_2SO_4$, $Na_2SO_3$, $Na_2S_2O_8$, $CH_3COONa$, NaF, NaCl, NaBr, NaI, $HOC(COONa)(CH_2COOH)_2$, $Na_xCoO_2$ ($0<x\leq 1$), $Na_xCo_{2/3}Mn_{1/3}O_2$ ($0<x\leq 1$), $Na_xFe_{1/2}Mn_{1/2}O_2$ ($0<x\leq 1$), $NaCrO_2$, $NaLi_{0.2}Ni_{0.25}Mn_{0.75}O_{2.35}$, $Na_{0.44}MnO_2$, $NaMnO_2$, $Na_{0.7}VO_2$, $Na_{0.33}V_2O_5$, $Na_3V_2(PO_4)_3$, $NaFePO_4$, $NaMn_{0.5}Fe_{0.5}PO_4$, $Na_3V_2(PO_4)_3$, $Na_2FePO_4F$, or $Na_3V_2(PO_4)_3$, but is not particularly limited thereto.

According to an embodiment of the present invention, the potassium precursor may include one of a K metal; a K oxide; a K compound or K oxide containing one or more of F, Cl, Br, I, C, N, P, S, and H; and a K composite oxide containing one or more metals of Li, Ti, V, Cr, Mn, Fe, Co, and Ni, or a combination thereof. The potassium precursor may be, for example, K, KOH, $KNO_3$, $KHSO_4$, $KHSO_3$, KCN, $KH_2PO_3$, $KH_2PO_4$, $KNO_3$, $K_3PO_4$, $K_2CO_3$, $K_2SO_4$, $K_2SO_3$, $CH_3COOK$, KF, KCl, KBr, KI, $KFeO_2$, $KCoO_2$, $KCrO_2$, $KMnO_2$, $KNiO_2$, $KNi_{1/2}Ti_{1/2}O_2$, $KNi_{1/2}Mn_{1/2}O_2$, $K_{2/3}Fe_{1/3}Mn_{2/3}O_2$, $KNi_{1/3}Co_{1/3}Mn_{1/3}O_2$, $K_{2/3}MnO_2$, $KMn_2O_4$, $K_{2/3}Ni_{1/3}Mn_{2/3}O_2$, $KNi_{1/2}Mn_{3/2}O_2$, $KFePO_4$, $KMnPO_4$, or $KCoPO_4$, but is not particularly limited thereto.

Though is not particularly limited thereto, according to an embodiment of the present invention, the process a2) may be the stirring of the silicon-based material doped with lithium; and a solution or dispersion including the sodium precursor or the potassium precursor so that a Na/Si molar ratio or K/Si molar ratio is in an appropriate range, thereby achieving the uniform current distribution effect by sodium or potassium doping better, which is thus preferred.

In an embodiment, the Na/Si molar ratio may be more than 0, 0.001 or more, 0.002 or more and 0.05 or less, 0.04 or less, 0.03 or less, or between the numerical values, and in a specific embodiment, the Na/Si molar ratio may be more than 0 and 0.05 or less, preferably 0.01 or more and 0.04 or less, and more preferably 0.02 or more and 0.03 or less.

In an embodiment, the K/Si molar ratio may be more than 0, 0.001 or more, 0.002 or more and 0.08 or less, 0.07 or less, 0.06 or less, 0.05 or less, 0.04 or less, 0.03 or less or between the numerical values, and in a specific embodiment, the K/Si molar ratio may be more than 0 and 0.08 or less, 0.001 or more and 0.06 or less, and 0.002 or more and 0.05 or less.

The solvent or the dispersion medium of the solution or dispersion including the sodium precursor or the potassium precursor may be a water-based or non-water-based solvent or dispersion medium, and may be all materials known in the art. According to a non-limiting example, the solvent or the dispersion medium may be water, alcohol, tetrahydrofuran (THF), or dimethylformamide (DMF).

Any stirring speed is sufficient as long as the sodium precursor or the potassium precursor and the silicon-based material are uniformly mixed, and without particular limitation, for example, may be 100 to 3000 rpm, 100 to 2000 rpm, 100 to 1000 rpm, preferably 300 to 3000 rpm, 300 to 2000 rpm, 300 to 1000 rpm, more preferably 500 to 3000 rpm, 500 to 2000 rpm, or 500 to 1000 rpm. The stirring time at this time is not particularly limited, but for example, may be 1 minute to 3 hours or 10 minutes to 3 hours.

Any temperature during stirring is sufficient as long as the sodium precursor or the potassium precursor and the silicon-based material are uniformly mixed, and without particular limitation, may be for example, 15 to 80° C., 15 to 70° C., or 15 to 65° C.

According to an embodiment of the present invention, the heat treatment process a3) may be performed in a temperature range of 200 to 1000° C., 200 to 600° C., 300 to 1000° C., 300 to 600° C., and 300 to 500° C. for 1 hour to 12 hours. In addition, the heat treatment may be performed in an inert gas atmosphere including one or more of $N_2$, Ar, and Ne, or may be performed under a reducing atmosphere including $H_2$ alone or 3-20% of $H_2$ and the remainder Ar.

According to an embodiment of the present invention, the process of doping lithium and the process of doping sodium or potassium may be performed in combination. According to an example, the silicon-based material, the sodium precursor or the potassium precursor, and the lithium precursor may be mixed simultaneously or successively.

According to another embodiment of the present invention in which the process of doping lithium and the process of doping sodium or potassium are performed in combination, a method of manufacturing a negative electrode for a lithium secondary battery including: b1) stirring a solution or dispersion including a silicon-based material including a silicon oxide, a lithium precursor, and a sodium precursor or a potassium precursor; and b2) heat treating the product of the process b1), thereby preparing a negative electrode active material doped with sodium or potassium, may be provided.

In an embodiment for single doping or co-doping of sodium or potassium, the process b1) may be the stirring of the solution or dispersion including the silicon-based material and the sodium precursor or the potassium precursor so that a Na/Si mole ratio is more than 0 and 0.05 or less or a K/Si mole ratio is more than 0 and 0.08 or less.

In an embodiment, the Na/Si molar ratio may be more than 0, 0.001 or more, 0.002 or more and 0.05 or less, 0.04 or less, 0.03 or less, or between the numerical values, and in a specific embodiment, the Na/Si molar ratio may be more than 0 and 0.05 or less, 0.01 or more and 0.04 or less, and 0.02 or more and 0.03 or less.

In an embodiment, the K/Si molar ratio may be more than 0, 0.001 or more, 0.002 or more and 0.08 or less, 0.07 or less, 0.06 or less, 0.05 or less, 0.04 or less, 0.03 or less or between the numerical values, and in a specific embodiment, the K/Si molar ratio may be more than 0 and 0.08 or less, 0.001 or more and 0.06 or less, and 0.002 or more and 0.05 or less.

Since each constituent of the solution or dispersion including the silicon-based material, the lithium precursor, and the sodium precursor and the potassium precursor, or the sodium precursor or the potassium precursor is as described in the processes a1) to a3), the description thereof will be omitted for convenience.

Any stirring speed is sufficient as long as the sodium precursor or the potassium precursor and the silicon-based material are uniformly mixed, and without particular limitation, for example, may be 100 to 3000 rpm, 100 to 2000 rpm, 100 to 1000 rpm, 300 to 3000 rpm, 300 to 2000 rpm, 300 to 1000 rpm, 500 to 3000 rpm, 500 to 2000 rpm, or 500 to 1000 rpm. The stirring time at this time is not particularly limited, but for example, may be 1 minute to 3 hours or 10 minutes to 3 hours.

Any temperature during stirring is sufficient as long as the sodium precursor or the potassium precursor and the silicon-based material are uniformly mixed, and without particular limitation, may be, for example, 15 to 80° C., 15 to 70° C., or 15 to 65° C.

According to an embodiment of the present invention, the heat treatment of process b2) may be performed in a temperature range of 200 to 1000° C., 200 to 600° C., 300 to 1000° C., 300 to 600° C., and 300 to 500° C. for 1 hour to 12 hours. In addition, the heat treatment may be performed in an inert gas atmosphere including one or more of $N_2$, Ar, and Ne, or may be performed under a reducing atmosphere including $H_2$ alone or 3-20% of $H_2$ and the remainder Ar.

The processes a1) to a3) or the processes b1) and b2) described above are performed to prepare the negative electrode active material doped with sodium or potassium, and then, according to an embodiment of the present invention, the negative electrode active material prepared above, the binder, the conductive material, and the like are mixed to prepare a negative electrode slurry, and the thus-prepared negative electrode slurry is applied on a current collector, dried, and rolled to manufacture a negative electrode including a current collector and a negative electrode active material layer prepared on the current collector.

According to an embodiment of the present invention, a lithium secondary battery including the negative electrode described above, a positive electrode, a separator provided between the negative electrode and the positive electrode, and an electrolyte solution may be provided.

The positive electrode may include, for example, a current collector and a positive electrode active material layer formed by applying a positive electrode slurry including a positive electrode active material on the current collector.

The current collector may be the negative electrode current collector described above, and any known material in the art may be used, but the present invention is not limited thereto.

The positive electrode active material layer includes a positive electrode active material, and optionally, may further include a binder and a conductive material. The positive electrode active material may be any positive electrode active material known in the art, and may be, for example, a composite oxide of a metal selected from cobalt, manganese, nickel, and a combination thereof with lithium. However, the positive electrode active material is not limited thereto.

The binder and the conductive material may be, for example, the negative electrode binder described above and the negative electrode conductive material, and may be a material known in the art. However, the binder and the conductive material are not limited to the example described above.

The separator may include, for example, glass fiber, polyester, polyethylene, polypropylene, polytetrafluoroethylene, or a combination thereof, and may be in the form of nonwoven or woven fabric. The separator may be a polyolefin-based polymer separator such as polyethylene and polypropylene, a separator coated with a composition including a ceramic component or a polymer material for securing heat resistance or mechanical strength, or a separator known in the art. The separator may have, for example, optionally a monolayer or multilayer structure. However, the material and the shape of the separator are not limited to the examples.

The electrolyte solution may include an organic solvent and a lithium salt.

The organic solvent serves as a medium in which ions involved in the electrochemical reaction of a battery may move. The organic solvent may be, for example, a carbonate-based, ester-based, ether-based, ketone-based, alcohol-based, or aprotic solvent alone or in combination of two or more, and when it is used in combination of two or more, a mixing ratio may be properly adjusted depending on the battery performance to be desired. However, the organic solvent is not limited to the examples described above.

The lithium salt is dissolved in the organic solvent and acts as a source of lithium ions in the battery to allow basic operation of the lithium secondary battery, and promotes movement of lithium ions between a positive electrode and a negative electrode. The lithium salt may include, for example, $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, LiB(C$_2$O$_4$)$_2$, or a combination thereof. However, the lithium salt is not limited to the examples described above.

A concentration of the lithium salt may be, for example, 0.1 to 2.0 M. When the lithium salt concentration is within the range, the electrolyte solution has appropriate conductivity and viscosity, and thus, significantly improved electrolyte solution performance may be shown.

The electrolyte solution according to an embodiment may further include pyridine, triethylphosphate, triethanolamine, cyclic ether, ethylene diamine, n-glyme, hexaphosphate triamide, a nitrobenzene derivative, sulfur, a quinone imine dye, N-substituted oxazolidinone, N,N-substituted imidazolidine, ethylene glycol dialkyl ether, an ammofnium salt, pyrrole, 2-methoxyethanol, aluminum trichloride, and the like, if necessary, for improving charge and discharge characteristics, flame retardant characteristics, and the like. For example, the electrolyte solution may further include a halogen-containing solvent such as carbon tetrachloride and ethylene trifluoride for imparting incombustibility. For example, the electrolyte solution may further include fluoroethylene carbonate (FEC), propene sulfone (PRS), fluoropropylene carbonate (FPC), and the like for improving preservation properties at a high temperature.

The lithium secondary battery according to an embodiment of the present invention may be manufactured by laminating the negative electrode, the separator, and the positive electrode in this order to form an electrode assembly, placing the manufactured electrode assembly in a cylindrical battery case or an angled battery case, and then injecting an electrolyte solution. The lithium secondary battery according to another embodiment may be manufactured by laminating the electrode assembly, immersing the assembly in the electrolyte solution, placing the resultant product in a battery case, and sealing the case. However, the method of manufacturing a lithium secondary battery is not limited to the examples described above.

As the battery case, those commonly used in the art may be adopted, there is no limitation in appearance depending on the battery use, and for example, a cylindrical shape, an angled shape, a pouch shape, a coin shape, or the like using a can may be used.

The lithium secondary battery according to the present invention may be used in a battery cell used as a power supply of a small device, and also may be preferably used as a battery cell in a medium or large battery module including a plurality of battery cells. An example of the medium or large battery module may include an electric automobile, a hybrid electric automobile, a plug-in hybrid electric automobile, a system for power storage, and the like. However, the use of the lithium secondary battery is not limited to the examples described above.

Hereinafter, the preferred examples and the comparative examples of the present invention will be described. However, the following examples are only a preferred embodiment of the present invention, and the present invention is not limited thereto.

EXAMPLES

Example 1

Preparation of Silicon-Based Material

A raw material in which Si and SiO$_x$ (0<x≤2) were mixed was introduced to a reaction furnace and evaporated at 600° C. for 5 hours in the atmosphere having a vacuum degree of 10 Pa, and the resulting product was deposited on a suction plate and sufficiently cooled, and then a deposit was taken out and pulverized. The pulverized silicon-based material was adjusted by sorting to obtain particles having an average particle diameter (D50) of about 8.0 μm.

Pre-Lithiation Process

The silicon-based material and LiH powder were mixed so that a Li/Si molar ratio was 0.4 to 1.0, thereby forming mixed powder, which was heat-treated at 700° C. for 4 to 10 hours in a nitrogen gas atmosphere. Subsequently, the heat-treated powder was recovered and pulverized in a mortar, thereby doping the silicon-based material with lithium.

Sodium or Potassium Doping Process

An aqueous dispersion in which lithium-doped silicon-based material and a sodium precursor (NaNO$_3$) were dispersed so that a Na/Si molar ratio was 0.025 was stirred at 300 to 1000 rpm at 20 to 60° C. for 30 minutes to 2 hours. The resultant product from stirring was filtered and dried, heat-treated at 300 to 500° C. for 30 minutes to 2 hours under a N$_2$ inert atmosphere, and then recovered.

Manufacture of Negative Electrode 5 to 30 wt % of the resultant product (negative electrode active material) from the previous process, 66 to 92 wt % of artificial graphite, 0.05 to 0.3 wt % of single wall-CNT (SW-CNT), 1.0 to 2.0 wt % of a carboxylmethyl cellulose (CMC) binder, 1.0 to 3.0 wt % of a styrene-butadiene rubber (SBR) binder were mixed in distilled water to prepare a negative electrode slurry. The negative electrode slurry was applied on a Cu foil current collector, dried, and rolled to manufacture a negative electrode having a negative electrode active material layer on the current collector by a common process.

Manufacture of Half Battery

The negative electrode manufactured, a lithium metal as a counter electrode, and a PE separator between the negative electrode and the counter electrode were disposed, and an electrolyte solution was injected to manufacture a CR2016 type coin cell. The assembled coin cell was paused at room temperature for 3 to 24 hours to manufacture a half battery. At this time, the electrolyte solution was obtained by mixing 1.0 M LiPF$_6$ as a lithium salt with an organic solvent (EC:EMC=30:70 vol %) and mixing 2 to 5 vol % of FEC as an electrolyte additive.

Example 2

In Example 2, a negative electrode and a half battery were manufactured under the same conditions as Example 1, except that the sodium or potassium doping process was performed under the following conditions.

An aqueous dispersion in which lithium-doped silicon-based material and a sodium precursor (NaNO$_3$) were dispersed so that a Na/Si molar ratio was 0.005 was stirred at 300 to 1000 rpm at 20 to 60° C. for 30 minutes to 2 hours. The resultant product from stirring was filtered and dried, heat-treated at 300 to 500° C. for 30 minutes to 2 hours under a N$_2$ inert atmosphere, and then recovered.

Example 3

In Example 3, a negative electrode and a half battery were manufactured under the same conditions as Example 1, except that the sodium or potassium doping process was performed under the following conditions.

An aqueous dispersion in which lithium-doped silicon-based material and a sodium precursor (NaNO$_3$) were dispersed so that a Na/Si molar ratio was 0.002 was stirred at 300 to 1000 rpm at 20 to 60° C. for 30 minutes to 2 hours.

The resultant product from stirring was filtered and dried, heat-treated at 300 to 500° C. for 30 minutes to 2 hours under a $N_2$ inert atmosphere, and then recovered.

Example 4

In Example 4, a negative electrode and a half battery were manufactured under the same conditions as Example 1, except that the sodium or potassium doping process was performed under the following conditions.

An aqueous dispersion in which lithium-doped silicon-based material and a potassium precursor ($NaNO_3$) were dispersed so that a K/Si molar ratio was 0.022 was stirred at 300 to 1000 rpm at 20 to 60° C. for 30 minutes to 2 hours. The resultant product from stirring was filtered and dried, heat-treated at 300 to 500° C. for 30 minutes to 2 hours under a $N_2$ inert atmosphere, and then recovered.

Example 5

In Example 5, a negative electrode and a half battery were manufactured under the same conditions as Example 1, except that the sodium or potassium doping process was performed under the following conditions.

An aqueous dispersion in which lithium-doped silicon-based material and a potassium precursor ($NaNO_3$) were dispersed so that a K/Si molar ratio was 0.004 was stirred at 300 to 1000 rpm at 20 to 60° C. for 30 minutes to 2 hours. The resultant product from stirring was filtered and dried, heat-treated at 300 to 500° C. for 30 minutes to 2 hours under a $N_2$ inert atmosphere, and then recovered.

Example 6

In Example 6, a negative electrode and a half battery were manufactured under the same conditions as Example 1, except that the sodium or potassium doping process was performed under the following conditions.

An aqueous dispersion in which lithium-doped silicon-based material and a potassium precursor ($NaNO_3$) were dispersed so that a K/Si molar ratio was 0.002 was stirred at 300 to 1000 rpm at 20 to 60° C. for 30 minutes to 2 hours. The resultant product from stirring was filtered and dried, heat-treated at 300 to 500° C. for 30 minutes to 2 hours under a $N_2$ inert atmosphere, and then recovered.

Example 7

In Example 7, a negative electrode and a half battery were manufactured under the same conditions as Example 1, except that the sodium or potassium doping process was performed under the following conditions.

An aqueous dispersion in which a lithium-doped silicon-based material, a sodium precursor ($NaNO_3$), and a potassium precursor ($KNO_3$) were dispersed so that a Na/Si molar ratio was 0.013 and a K/Si molar ratio was 0.011 was stirred at 300 to 1000 rpm at 20 to 60° C. for 30 minutes to 2 hours. The resultant product from stirring was filtered and dried, heat-treated at 300 to 500° C. for 30 minutes to 2 hours under a $N_2$ inert atmosphere, and then recovered.

Comparative Example 1

In Comparative Example 1, the pre-lithiation process and the sodium or potassium doping process of Example 1 were not performed. Other than that, a negative electrode and a half battery were manufactured under the same conditions.

Comparative Example 2

In Comparative Example 1, the sodium or potassium doping process of Example 1 was not performed. Other than that, a negative electrode and a half battery were manufactured under the same conditions.

Comparative Example 3

In Comparative Example 3, a negative electrode and a half battery were manufactured under the same conditions as in Example 1, except that the pre-lithiation process of Example 1 was not performed (no lithium doped), and the sodium or potassium doping process was performed under the following conditions.

An aqueous dispersion in which a silicon-based material, a sodium precursor ($NaNO_3$), and a potassium precursor ($KNO_3$) were dispersed so that a Na/Si molar ratio was 0.013 and a K/Si molar ratio was 0.011 was stirred at 300 to 1000 rpm at 20 to 60° C. for 30 minutes to 2 hours. The resultant product from stirring was filtered and dried, heat-treated at 300 to 500° C. for 30 minutes to 2 hours under a $N_2$ inert atmosphere, and then recovered.

Comparative Example 4

In Comparative Example 4, a negative electrode and a half battery were manufactured under the same conditions as Example 1, except that the sodium or potassium doping process was performed under the following conditions.

An aqueous dispersion in which lithium-doped silicon-based material and a sodium precursor ($NaNO_3$) were dispersed so that a Na/Si molar ratio was 0.052 was stirred at 300 to 1000 rpm at 20 to 60° C. for 30 minutes to 2 hours. The resultant product from stirring was filtered and dried, heat-treated at 300 to 500° C. for 30 minutes to 2 hours under a $N_2$ inert atmosphere, and then recovered.

Comparative Example 5

In Comparative Example 5, in the pre-lithiation process, lithium was excessively doped by adding LiH so that a Li/Si molar ratio was 2.0 or more. Other than that, a negative electrode and a half battery were manufactured under the same conditions.

Comparative Example 6

In Comparative Example 6, a negative electrode and a half battery were manufactured under the same conditions as Example 1, except that the sodium or potassium doping process was performed under the following conditions.

An aqueous dispersion in which lithium-doped silicon-based material and a potassium precursor ($KNO_3$) were dispersed so that a K/Si molar ratio was 0.087 was stirred at 300 to 1000 rpm at 20 to 60° C. for 30 minutes to 2 hours. The resultant product from stirring was filtered and dried, heat-treated at 300 to 500° C. for 30 minutes to 2 hours under a $N_2$ inert atmosphere, and then recovered.

Comparative Example 7

In Comparative Example 7, a negative electrode and a half battery were manufactured under the same conditions as Example 1, except that the sodium or potassium doping process was performed under the following conditions.

An aqueous dispersion in which a lithium-doped silicon-based material, sodium precursor (NaNO$_3$), and a potassium precursor (KNO$_3$) were dispersed so that a Na/Si molar ratio was 0.052 and a K/Si molar ratio was 0.087 was stirred at 300 to 1000 rpm at 20 to 60° C. for 30 minutes to 2 hours. The resultant product from stirring was filtered and dried, heat-treated at 300 to 500° C. for 30 minutes to 2 hours under a N$_2$ inert atmosphere, and then recovered.

In order to analyze the battery properties of each of the examples and the comparative examples, ICP analysis of the negative electrode active material layer was performed, a discharge capacity, initial efficiency, and a capacity retention rate were measured, and the results are shown in the following Table 1.

The ICP analysis of the negative electrode active material layer was performed as follows. The half battery manufactured was charged at a constant current at room temperature (25° C.) until the voltage reached 0.01 V (vs. Li/Li$^+$) at a current of 0.1 C rate, and then was charged with a constant voltage by cut-off at a current of 0.01 C rate while maintaining 0.01 V in a constant voltage mode. The battery was discharged at a constant current of 0.1 C rate until the voltage reached 1.5 V (vs. Li/Li$^+$). One charge and discharge cycle was performed under the charge and discharge conditions, and then disassembly was performed to obtain a negative electrode. Next, the disassembled negative electrode was washed with an organic solvent such as dimethyl carbonate (DMC) several times, and negative electrode active material layer powder was recovered by scrapping off the powder so that a current collector was not included.

A method of measuring the Li content (A), the Na content (B), and K content (C) using the negative electrode active material layer powder recovered above followed the following:

[1] adding 0.01 to 0.05 g of the recovered negative electrode active material layer powder to a 50 mL PP tube;

[2] adding a nitric acid to the PP tube and then adding a hydrofluoric acid thereto until brown fume does not occur;

[3] heating the PP tube with a heating block and drying the tube to remove a hydrofluoric component;

[4] adding a nitric acid and hydrogen peroxide to the PP tube and then heating the PP tube with a heating block for redissolving;

[5] cooling the resulting product to room temperature, diluting it with ultrapure water, and filtering it for removing insoluble components to prepare a sample; and

[6] performing ICP analysis on the prepared sample to measure the Li content (A), the Na content (B), and the K content (C) (A, B, and C are the weights (ppm) of Li, Na, and K included based on the total weight of the negative electrode active material layer (powder) to be measured, respectively).

The ICP analysis used Optima 8300DV available from Perkin Elmer. The ICP analysis results were derived as weight ratios (ppm) of Li, Na, and K in the negative electrode active material layer, based on the total weight of the ICP-analyzed negative electrode active material layer, and the results are shown in Table 1.

The sum of Na content (B) (ppm) and the K content (C) (ppm) derived is indicated as "B+C" and shown in Table 1 together.

A value derived by substituting the Li content (A) (ppm), the Na content (B) (ppm), and the K content (C) (ppm) into "$10^6*A/(B^2+C^2)$" of the following Relation (1) is shown in Table 1 together.

$$300 \leq 10^6 * A/(B^2+C^2) \leq 12.0*10^6 \quad (1)$$

wherein A is a Li content in ppm, B is a Na content in ppm, and C is a K content in ppm.

The measurement for a discharge capacity (mAh/g) was performed as follows. A TOSCAT series charging and discharging device available from Toyo system Co., LTD. was used, the half battery manufactured of each of the examples and the comparative examples was charged at a constant current with a 0.1 C rate current until the voltage was 0.010 V (vs. Li/Li$^+$) at room temperature, and then was charged with a constant voltage by cut-off at a current of 0.01 C rate while maintaining 0.01 V in a constant voltage mode. The battery was discharged at a constant current of 0.1 C rate until the voltage reached 1.5 V (vs. Li/Li$^+$).

Initial efficiency (%) was calculated as a percentage of discharge capacity at one cycle/charge capacity at one cycle in the measurement method.

The life retention rate (%) was measured as follows. It was measured using a TOSCAT series charge and discharge available from Toyo system Co., LTD., the discharge capacity measured after one cycle of charge and discharge was a reference capacity, one cycle of charge and discharge was further performed under the same conditions, an application current was changed to 0.5 C to perform charge and discharge, and a 10 minute pause was placed between each cycle. A percentage of the discharge capacity after 200 cycles to the discharge capacity after one cycle of charge and discharge is indicated as "life retention rate (%, @200)", and shown in Table 1.

TABLE 1

| | ICP analysis results of negative electrode active material layer | | | | | | | |
|---|---|---|---|---|---|---|---|---|
| | Li content (A) (ppm) | Na content (B) (ppm) | K content (C) (ppm) | B + C | $10^6 * A/(B^2 + C^2)$ | Discharge capacity (mAh/g) | Initial efficiency (%) | Life retention rate (%, @200) |
| Example 1 | 23,000 | 5,500 | 11 | 5,511 | 760 | 1,258 | 87.2 | 89.2 |
| Example 2 | 46,000 | 490 | 14 | 504 | 191,431 | 1,317 | 88.1 | 88.4 |
| Example 3 | 31,000 | 370 | 5 | 375 | 226,401 | 1,276 | 88.3 | 88.7 |
| Example 4 | 4,000 | 27 | 1,050 | 1,077 | 3626 | 1,299 | 87.8 | 87.5 |
| Example 5 | 34,000 | 28 | 390 | 418 | 222,391 | 1,302 | 88.5 | 89.5 |
| Example 6 | 29,000 | 36 | 45 | 81 | 8.73 * 10$^6$ | 1,277 | 88.1 | 86.9 |

TABLE 1-continued

|  | ICP analysis results of negative electrode active material layer | | | | | | | |
|---|---|---|---|---|---|---|---|---|
|  | Li content (A) (ppm) | Na content (B) (ppm) | K content (C) (ppm) | B + C | $10^6 * A/(B^2 + C^2)$ | Discharge capacity (mAh/g) | Initial efficiency (%) | Life retention rate (%) (%, @200) |
| Example 7 | 26,000 | 1,350 | 560 | 1,910 | 12,172 | 1,285 | 88.2 | 86.9 |
| Comparative Example 1 | 700 | 22 | 5 | 27 | $1.38 * 10^6$ | 1,110 | 74.1 | 64.2 |
| Comparative Example 2 | 25,000 | 15 | 8 | 23 | $86.5 * 10^6$ | 1,313 | 87.6 | 75.8 |
| Comparative Example 3 | 300 | 530 | 2,850 | 3,380 | 36 | 1,201 | 73.2 | 68.1 |
| Comparative Example 4 | 18,000 | 23,000 | 9 | 23,009 | 34 | 1170 | 81.1 | 81.6 |
| Comparative Example 5 | 145,000 | 102 | 7 | 109 | $13.9 * 10^6$ | 870 | 65.3 | 43.1 |
| Comparative Example 6 | 27,000 | 16 | 13,000 | 13,016 | 160 | 1,184 | 83.1 | 82.2 |
| Comparative Example 7 | 23,000 | 21,000 | 14,000 | 35,000 | 36 | 1,090 | 79.4 | 55.4 |

Each of the examples and the comparative examples was evaluated referring to Table 1.

Referring to Table 1, Examples 1 to 7 satisfying an embodiment of the present invention satisfied the lithium content and Relation (1) in the ICP analysis of the negative electrode active material layer defined in the present invention, and as a result, secured a uniform current distribution on the surface of the negative electrode active material in the prelithiated negative electrode to further improve battery properties such as life properties together with the initial efficiency.

Comparative Example 1 in which both the pre-lithiation process and the sodium or potassium doping process were not performed had an initial efficiency was 74.1% which was low, a discharge capacity of less than 1,200 mAh/g, and a life retention rate of about 64.2%, and thus, had poor battery properties such as initial efficiency and life characteristics.

Comparative Example 2 in which only the pre-lithiation process was performed and the sodium or potassium doping process was not performed had higher initial efficiency and discharge capacity than Comparative Example 1, but had poor life characteristics so that a life retention rate was about 75.8%.

In Comparative Example 3, the pre-lithiation process was not performed and only the sodium and potassium doping process was performed. As a result, $SiO_x$ and Li ions reacted to produce a large amount of an irreversible phase to cause many side reactions with electrode deterioration, and thus, initial efficiency was about 73.2% which was poor as compared with the examples. In addition, Comparative Example 3 in which the pre-lithiation process was not performed did not satisfy Relation (1), and as a result, did not obtain the sodium and potassium doping effect, and thus, had poor battery properties such as life characteristics of a life retention rate of about 68.1%.

Comparative Example 4 in which sodium was excessively doped and Comparative Example 6 in which potassium was excessively doped did not satisfy Relation (1) with the value of Relation (1) of less than 300. As a result, a smooth reaction between Li ions and electrons was rather hindered and the life properties were deteriorated so that the life retention rate was about 81.6% and 82.2%, respectively.

Comparative Example 5 in which lithium was excessively doped during the pre-lithiation process did not satisfy Relation (1), and had a difficulty in electrode manufacture due to the deteriorated slurry physical properties. As a result, a uniform current was not secured even with sodium doping, so that the life properties were particularly deteriorated with the life retention rate of about 43.1%, and discharge capacity implement and initial efficiency were very poor. In particular, in Comparative Example 5, sodium was doped at the same amount as in Example 1, but a sodium content was less detected in the ICP analysis. This is the result from the fact that due to excessive lithium doping, an excessive amount of lithium compound surrounded the negative electrode active material so that sodium did not directly react with or dope in the negative electrode active material, and during the slurry preparation, the excessive lithium compound on the surface of the negative electrode active material was dissolved in moisture to remove sodium or potassium together, so that doping was not sufficiently performed.

Comparative Example 7 in which sodium or potassium was excessively doped did not satisfy Relation (1). As a result, a smooth reaction between Li ions and electrons was hindered by the excessive sodium and potassium doping, and thus, life characteristics was deteriorated so that the life retention rate was about 55.4%.

The negative electrode for a lithium secondary battery according to an embodiment of the present invention may secure sufficient initial battery efficiency and also secure a uniform current distribution on the surface of a negative electrode active material by performing a process of single doping or co-doping a silicon-based material including a prelithiated silicon oxide with sodium or potassium, and thus, may further improve life characteristics.

According to an embodiment of the present invention, in ICP analysis of the negative electrode active material layer, contents of elements in the negative electrode active material layer satisfy the following Relations (1) and (2), thereby securing sufficient initial battery efficiency by a pre-lithiation process and also securing a uniform current distribution of the surface of the negative electrode active material to further improve life characteristics:

$$300 \leq 10^6 * A/(B^2+C^2) \leq 12.0*10^6 \quad (1)$$

$$800 \leq A \leq 140{,}000 \quad (2)$$

wherein A is a Li content in ppm, B is a Na content in ppm, and C is a K content in ppm, based on the total weight of the ICP-analyzed negative electrode active material layer.

What is claimed is:

1. A negative electrode for a lithium secondary battery comprising a negative electrode active material including:
   a silicon oxide;
   lithium; and
   sodium or potassium,
   wherein in ICP analysis of a negative electrode active material layer including the negative electrode active material, contents of elements in the negative electrode active material layer satisfy the following Relations (1) and (2):

$$300 \leq 10^6 * A/(B^2 + C^2) \leq 12.0 * 10^6 \quad (1)$$

$$800 \leq A \leq 140{,}000 \quad (2)$$

wherein A is a Li content in ppm, B is a Na content in ppm, and C is a K content in ppm, based on the total weight of the negative electrode active material layer.

2. The negative electrode for a lithium secondary battery of claim 1, wherein in the ICP analysis of the negative electrode active material layer, the contents of elements in the negative electrode active material layer further satisfy the following Relations (3) and (4):

$$50 \leq B \leq 20{,}000 \quad (3)$$

$$15 \leq C \leq 10{,}000 \quad (4)$$

wherein B is a Na content in ppm, and C is a K content in ppm, based on the total weight of the negative electrode active material layer.

3. The negative electrode for a lithium secondary battery of claim 2, wherein
   in Relation (3), $200 \leq B \leq 20{,}000$ is satisfied, or
   in Relation (4), $30 \leq C \leq 10{,}000$ is satisfied.

4. The negative electrode for a lithium secondary battery of claim 1, wherein in the ICP analysis of the negative electrode active material layer, the contents of elements in the negative electrode active material layer further satisfy the following Relations (5):

$$25 \leq B + C \quad (5)$$

wherein B is a Na content in ppm, and C is a K content in ppm, based on the total weight of the negative electrode active material layer.

5. The negative electrode for a lithium secondary battery of claim 1, wherein the negative electrode active material includes lithium silicate represented by the following Chemical Formula 1:

$$Li_xSi_yO_z \quad \text{[Chemical Formula 1]}$$

wherein $1 \leq x \leq 6$, $1 \leq y \leq 4$, and $0 < z \leq 7$.

6. The negative electrode for a lithium secondary battery of claim 1, further comprising artificial graphite.

7. The negative electrode for a lithium secondary battery of claim 1, further comprising single-walled carbon nanotubes.

8. A method of manufacturing a negative electrode for a lithium secondary battery, the method comprising:
   a1) performing pre-lithiation by mixing a silicon-based material including a silicon oxide and a lithium precursor and heat treating the mixture to dope the silicon-based material with lithium;
   a2) stirring a solution or dispersion including the silicon-based material doped with lithium and a sodium precursor or a potassium precursor; and
   a3) heat treating the resultant product of the process a2, thereby preparing a negative electrode active material doped with sodium or potassium.

9. The method of manufacturing a negative electrode for a lithium secondary battery of claim 8, wherein in the process a1, the silicon-based material and the lithium precursor are mixed so that a Li/Si molar ratio is 0.3 to 1.2.

10. The method of manufacturing a negative electrode for a lithium secondary battery of claim 8, wherein the stirring in the process a2 is continued until a Na/Si mole ratio is more than 0 and 0.05 or less or a K/Si mole ratio is more than 0 and 0.08 or less.

11. The method of manufacturing a negative electrode for a lithium secondary battery of claim 8, wherein a stirring speed in the process a2 is 100 to 3000 rpm.

12. The method of manufacturing a negative electrode for a lithium secondary battery of claim 8, wherein a temperature during the stirring in the process a2 is 15 to 80° C.

13. The method of manufacturing a negative electrode for a lithium secondary battery of claim 8, wherein the heat treating in the process a3) is performed at 200 to 1000° C.

14. The method of manufacturing a negative electrode for a lithium secondary battery of claim 8, wherein the sodium precursor includes one of a Na metal; a Na oxide; a Na compound or Na oxide containing one or more of F, Cl, Br, I, C, N, P, S, and H; and a Na composite oxide containing one or more metals of Li, Ti, V, Cr, Mn, Fe, Co, and Ni, or a combination thereof.

15. The method of manufacturing a negative electrode for a lithium secondary battery of claim 8, wherein the potassium precursor includes one of a K metal; a K oxide; a K compound or K oxide containing one or more of F, Cl, Br, I, C, N, P, S, and H; and a K composite oxide containing one or more metals of Li, Ti, V, Cr, Mn, Fe, Co, and Ni, or a combination thereof.

16. The method of manufacturing a negative electrode for a lithium secondary battery of claim 8, wherein the silicon-based material is selected from the group consisting of $SiO_x$ ($0 < x \leq 2$); and one or more of Si, a Si-containing alloy, and a Si/C composite.

17. A method of manufacturing a negative electrode for a lithium secondary battery, the method comprising:
   b1) stirring a solution or dispersion including a silicon-based material including a silicon oxide, a lithium precursor, and a sodium precursor or a potassium precursor; and
   b2) heat treating the resultant product of the process b1), thereby preparing a negative electrode active material doped with sodium or potassium.

18. The method of manufacturing a negative electrode for a lithium secondary battery of claim 17, wherein in the process b1 the stirring of the solution or dispersion including the silicon-based material and the sodium precursor or the potassium precursor continues to obtain a Na/Si mole ratio of more than 0 and 0.05 or less or a K/Si mole ratio of more than 0 and 0.08 or less.

19. The method of manufacturing a negative electrode for a lithium secondary battery of claim 17, wherein the heat treating in the process b2 is performed at 200 to 1000° C.

20. A lithium secondary battery comprising the negative electrode of claim 1.

* * * * *